United States Patent
Komuro

(10) Patent No.: US 11,110,790 B2
(45) Date of Patent: Sep. 7, 2021

(54) CONTROL APPARATUS AND CONTROL METHOD FOR VEHICLE

(71) Applicant: SUBARU CORPORATION, Tokyo (JP)

(72) Inventor: Masaki Komuro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 275 days.

(21) Appl. No.: 16/371,450

(22) Filed: Apr. 1, 2019

(65) Prior Publication Data

US 2019/0359050 A1  Nov. 28, 2019

(30) Foreign Application Priority Data

May 23, 2018  (JP) .............................. JP2018-098979

(51) Int. Cl.
*B60K 6/48* (2007.10)
*B60W 20/13* (2016.01)
*B60L 50/16* (2019.01)
*B60W 10/04* (2006.01)

(52) U.S. Cl.
CPC ............... *B60K 6/48* (2013.01); *B60L 50/16* (2019.02); *B60W 20/13* (2016.01); *B60K 2006/4825* (2013.01); *B60W 10/04* (2013.01); *B60W 2520/10* (2013.01); *B60W 2540/10* (2013.01)

(58) Field of Classification Search
CPC ...................................................... B60K 6/48
See application file for complete search history.

(56) References Cited

U.S. PATENT DOCUMENTS

| 9,421,967 | B2* | 8/2016 | Ueno | B60W 20/10 |
| 9,789,866 | B2* | 10/2017 | Park | B60W 10/06 |
| 9,932,914 | B2* | 4/2018 | Mansour | B60K 6/48 |
| 9,950,705 | B2* | 4/2018 | Gibson | B60W 10/06 |
| 10,556,582 | B2* | 2/2020 | Lee | B60W 10/08 |
| 2015/0019061 | A1 | 1/2015 | Ueno | |
| 2019/0359201 | A1* | 11/2019 | Komuro | B60W 10/08 |

FOREIGN PATENT DOCUMENTS

WO  WO2013/137080 A1  9/2013

* cited by examiner

*Primary Examiner* — Michael A Berns
(74) *Attorney, Agent, or Firm* — Troutman Pepper Hamilton Sanders LLP

(57) ABSTRACT

A control apparatus for a vehicle capable of switching an electrically-operated driving mode and a hybrid driving mode includes: a driving mode setter; a driving force difference calculator; and a delay controller. The driving mode setter sets the electrically-operated driving mode when a target driving force is lower than or equal to a continuous line of a mode switching threshold set in accordance with a vehicle speed, and sets the hybrid driving mode when the target driving force exceeds the continuous line of the mode switching threshold. The driving force difference calculator calculates a driving force difference that is a difference between the target driving force and the mode switching threshold. The delay controller sets a delay time from the target driving force crossing the continuous line of the mode switching threshold to a driving mode being switched on a basis of the driving force difference and the vehicle speed.

14 Claims, 8 Drawing Sheets

US 11,110,790 B2

CONTROL APPARATUS AND CONTROL METHOD FOR VEHICLE

CROSS-REFERENCE TO RELATED APPLICATIONS

The present application claims priority from Japanese Patent Application No. 2018-098979 filed on May 23, 2018, the entire contents of which are hereby incorporated by reference.

BACKGROUND

The disclosure relates to a control apparatus and control method for a vehicle.

In recent years, as a power source of a vehicle such as an automobile, a hybrid vehicle including both an engine and a motor has been known. Examples thereof include a hybrid vehicle that is subjected to drive control while switching an electrically-operated driving mode in which the hybrid vehicle travels with only an output of a motor, and a hybrid driving mode in which the hybrid vehicle travels with a combination of an output of the engine and an output of a motor. The hybrid vehicle includes a vehicle that is set at the electrically-operated driving mode when target driving force is lower than or equal to a continuous line of a mode switching threshold set in accordance with vehicle speed, and transitions to the hybrid driving mode when the target driving force exceeds the continuous line of the mode switching threshold.

If such a vehicle is set to transition to the hybrid driving mode and start the engine once the target driving force exceeds the continuous line of the mode switching threshold even for temporary acceleration, the fuel efficiency can be worse. For this, WO 2013/137080 proposes technology of delaying a start of an engine to suppress a start of the engine in the case where an accelerator is unintentionally stepped on when starting to move, and then released immediately. More specifically, technology is disclosed that, when required torque information exceeds a base start line and satisfies a condition for applying an extension start line to satisfy an electric vehicle (EV) traveling region extension condition for extending a traveling region in the electrically-operated driving mode while traveling in the electrically-operated driving mode, changes an engine start line from the base start line to the extension start line during a predetermined time elapsed since the EV traveling region extension condition is satisfied, and changes the engine start line from the extension start line to the base start line after the predetermined time.

SUMMARY

An aspect of the disclosure provides a control apparatus for a vehicle capable of switching an electrically-operated driving mode in which a drive motor is used and a hybrid driving mode in which the drive motor and an engine are used. The control apparatus includes: a driving mode setter configured to set the electrically-operated driving mode when a target driving force is lower than or equal to a continuous line of a mode switching threshold set in accordance with a vehicle speed, and set the hybrid driving mode when the target driving force exceeds the continuous line of the mode switching threshold; a driving force difference calculator configured to calculate a driving force difference that is a difference between the target driving force and the mode switching threshold; and a delay controller configured to set a delay time from the target driving force crossing the continuous line of the mode switching threshold to a driving mode being switched on a basis of the driving force difference and the vehicle speed.

An aspect of the disclosure provides a control method for a vehicle that controls a driving force of the vehicle while switching an electrically-operated driving mode in which a drive motor is used, and a hybrid driving mode in which the drive motor and an engine are used, the electrically-operated driving mode being set when a target driving force is lower than or equal to a continuous line of a mode switching threshold set in accordance with a vehicle speed, the hybrid driving mode being set when the target driving force exceeds the continuous line of the mode switching threshold. The control method includes: setting, when the target driving force crosses the continuous line of the mode switching threshold, a delay time from the target driving force crossing the continuous line of the mode switching threshold to a driving mode being switched on a basis of a driving force difference that is a difference between the target driving force and the mode switching threshold, and the vehicle speed.

An aspect of the disclosure provides a vehicle capable of switching an electrically-operated driving mode in which a drive motor is used and a hybrid driving mode in which the drive motor and an engine are used. The control apparatus includes circuitry configured to set the electrically-operated driving mode when a target driving force is lower than or equal to a continuous line of a mode switching threshold set in accordance with a vehicle speed, and set the hybrid driving mode when the target driving force exceeds the continuous line of the mode switching threshold, calculate a driving force difference that is a difference between the target driving force and the mode switching threshold, and set a delay time from the target driving force crossing the continuous line of the mode switching threshold to a driving mode being switched on a basis of the driving force difference and the vehicle speed.

DETAILED DESCRIPTION

Figure 1:
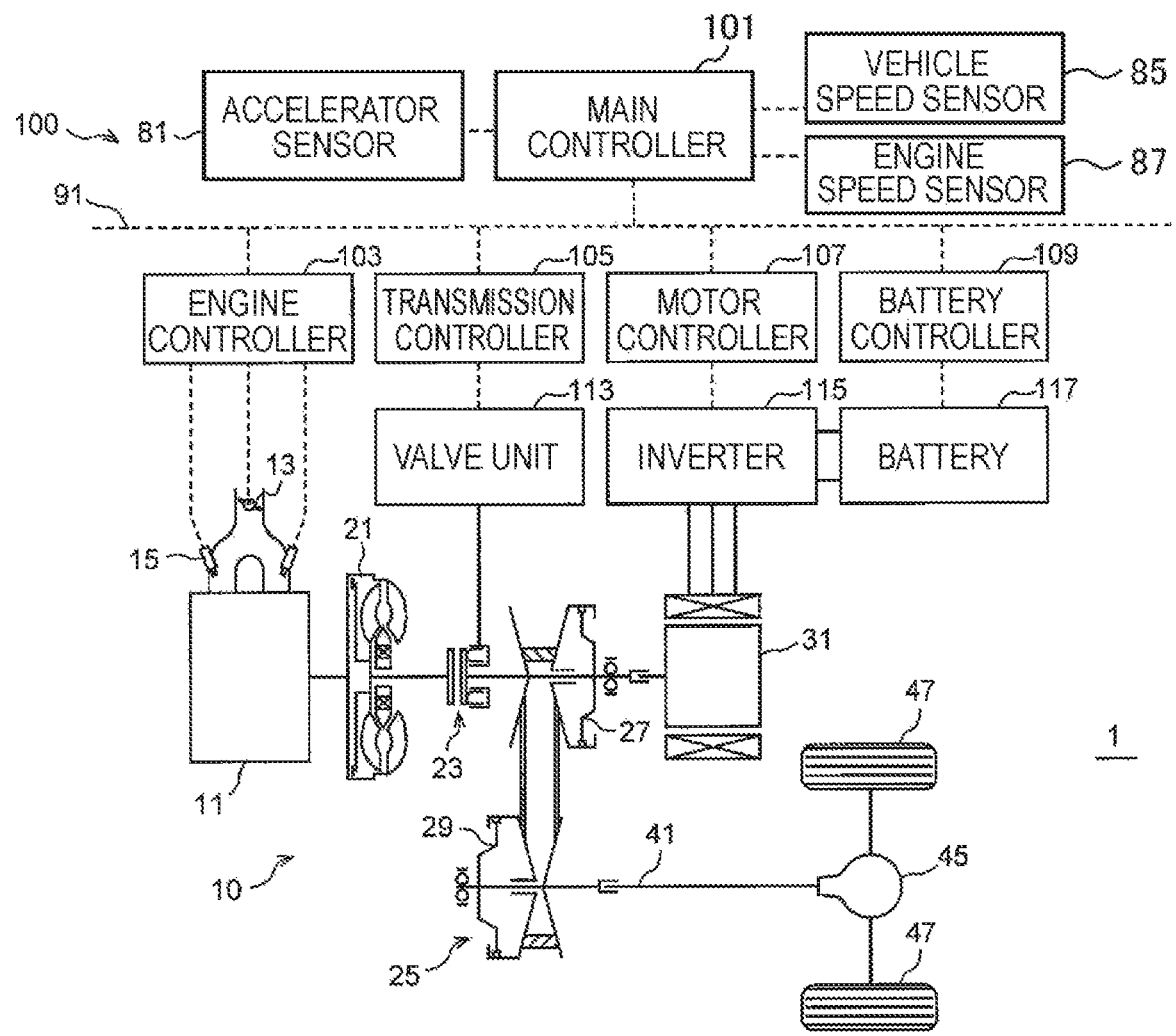
FIG. 1 is a schematic diagram illustrating a configuration example of a hybrid vehicle to which a control apparatus for a vehicle according to an embodiment of the disclosure can be applied.

Hereinafter, preferred embodiments of the disclosure will be described in detail with reference to the appended drawings. Note that, in this specification and the appended drawings, structural elements that have substantially the same function and structure are denoted with the same reference numerals, and repeated description of these structural elements is omitted.

The technology disclosed in WO 2013/137080 sets an engine start line at an extension start line in the case where an accelerator opening rate exceeds an accelerator opening rate threshold that is change speed at which it can be determined that an accelerator position angle definitely exceeds the engine start line. Conversely, in the case where the accelerator is slowly stepped on, the vehicle speed and the accelerator position angle have already high values to some extent in general. It can be determined to be unlikely to transition to an electrically-operated driving mode immediately after the engine is started, so that the engine start line is prevented from being set at the extension start line.

However, target driving force can also exceed temporarily a continuous line of a mode switching threshold to start the engine, for example, in a scene such as traffic congestion in which the accelerator is slowly stepped on more to adjust the speed.

It is desirable to provide a control apparatus and control method for a vehicle which set a delay time before switching a driving mode is set in accordance with the traveling state of the vehicle irrespective of the change speed of an accelerator position angle, and can reduce the fuel consumption amount.

<1. Overall Configuration Example of Hybrid Vehicle>

First, a configuration example of a hybrid vehicle to which a control apparatus for a vehicle according to an example of the embodiment can be applied will be described. FIG. 1 is a schematic diagram illustrating a hybrid vehicle 1 including a control apparatus 100 for a vehicle. The following describes an overall configuration example of the hybrid vehicle 1 individually for a power unit 10 and the control apparatus (electronic control system) 100.

(1-1. Power Unit)

The power unit 10 of the hybrid vehicle 1 includes, as power sources, an engine 11 and a motor generator 31. The motor generator 31 functions as a drive motor. In addition, the power unit 10 includes a continuously variable transmission (which will also be referred to as "CVT" below) 25 including a primary pulley 27 and a secondary pulley 29.

One of the sides of the shaft of the primary pulley 27 is linked to the engine 11 via a torque converter 21. The other side of the shaft of the primary pulley 27 is linked to the motor generator 31. The shaft of the secondary pulley 29 is linked to driving wheels 47 via a driving wheel output shaft 41 and a differential mechanism 45. In this way, the driving wheels 47 are linked to the motor generator 31 and the engine 11.

The motor generator 31 is coupled to a battery 117 via an inverter 115. The inverter 115 has a function of mutually converting direct-current power and alternating-current power. When the motor generator 31 is controlled in a power running state, the inverter 115 converts direct-current power into alternating-current power and the motor generator 31 is supplied with electric power from the battery 117 via the inverter 115. Meanwhile, the motor generator 31 is controlled in a power generating state, that is, a regenerative state, the inverter 115 converts alternating-current power into direct-current power and the battery 117 is supplied with electric power from the motor generator 31 via the inverter 115.

There is provided an engine clutch 23 that is switched between an engaged state and a release state between the torque converter 21 and the primary pulley 27, that is, between the engine 11 and the driving wheels 47. Switching the engine clutch 23 to the engaged state couples the torque converter 21 to the primary pulley 27, and couples the engine 11 to the driving wheels 47. In this way, in the engaged state of the engine clutch 23, drive control is performed in a hybrid driving mode in which the power of the engine 11 and the motor generator 31 is transmitted to the driving wheels 47.

Meanwhile, switching the engine clutch 23 to the release state uncouples the torque converter 21 from the primary pulley 27, and the engine 11 is uncoupled from the driving wheels 47. Even in the case where the engine 11 is uncoupled from the driving wheels 47, the coupled state between the driving wheels 47 and the motor generator 31 remains. That is, switching the engine clutch 23 to the release state makes it possible to uncouple the driving wheels 47 and the engine 11 from each other in the state in which the driving wheels 47 and the motor generator 31 are coupled to each other. In this way, in the release state of the engine clutch 23, drive control is performed in the electrically-operated driving mode in which only the power of the motor generator 31 is transmitted to the driving wheels 47.

(1-2. Control Apparatus)

The overall configuration of the control apparatus 100 for the hybrid vehicle 1 will be described. As illustrated in FIG. 1, the hybrid vehicle 1 includes a variety of controllers including microcomputers and the like to control the working state of the power unit 10. As the variety of controllers, an engine controller 103, a transmission controller 105, a motor controller 107, a battery controller 109, and a main controller 101 are included.

Some or all of the respective controllers may include, for example, microcomputers, microprocessor units, and the like. In addition, some or all of the respective controllers may include firmware and the like that can be updated, or may be program modules and the like that are executed in accordance with an instruction from a CPU and the like.

In addition, each controller includes a storage (not illustrated) that stores a program executed by a microcomputer and the like, information of a parameter, detection data and a calculation result which is used for various kinds of calculation, and the like. The storage may be, for example, a storage element such as a random access memory (RAM) or a read only memory (ROM), or may also be a storage such as a hard disk drive (HDD), a CD-ROM, or a storage apparatus.

The engine controller 103 controls the engine 11. The transmission controller 105 controls the CVT 25 and the like. The motor controller 107 controls the motor generator 31. The battery controller 109 controls the battery 117. The main controller 101 integrally controls these controllers.

These controllers are coupled to each other via one or more in-vehicle networks 91 such as controller area networks (CANs) or local internets (LINs) in a communicable manner.

The main controller 101 outputs a control signal to each controller, and causes the engine 11, the motor generator 31, and the like included in the power unit 10 to cooperate with each other for control. The main controller 101 is coupled to an accelerator sensor 81, a vehicle speed sensor 85, and an engine speed sensor 87. The accelerator sensor 81 detects the operation amount of an accelerator pedal. The vehicle speed sensor 85 detects vehicle speed. The engine speed sensor 87 detects engine speed that is the rotational speed of a crankshaft.

The main controller 101 sets the control target of the engine 11, the motor generator 31 or the like on the basis of information transmitted from each sensor or controller, and outputs a control signal to each controller on the basis of the set control target. Each controller that receives a control signal from the main controller 101 controls the engine 11, the motor generator 31, or the like as follows.

That is, the engine controller 103 outputs control signals to a throttle valve 13, an injector 15, and the like to control the engine torque, the engine speed, and the like. The transmission controller 105 outputs a control signal to a valve unit 113 that adjusts the pressure of a working fluid, and controls the working state of the CVT 25, the engine clutch 23, the torque converter 21, and the like. The motor controller 107 outputs a control signal to the inverter 115 to control the motor torque, motor rotational speed, and the like of the motor generator 31. The battery controller 109 monitors the charging and discharging of the battery 117, and controls the relay and the like inside the battery 117 as required. In this way, the respective controllers control the engine 11, the motor generator 31, the engine clutch 23, and the like.

<2. Specific Example of Control Apparatus>

Next, a specific instance of the control apparatus 100 for the hybrid vehicle 1 according to the embodiment will be described.

Figure 2:
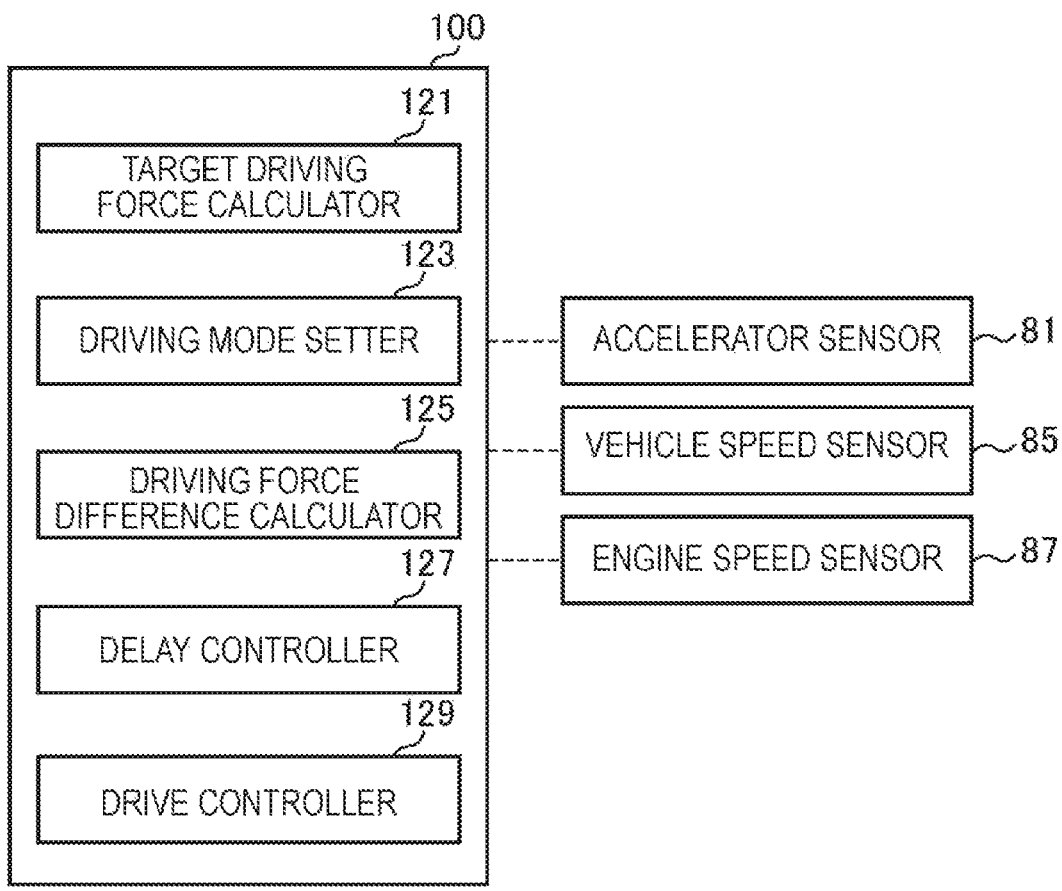
FIG. 2 is a block diagram illustrating a configuration example of the control apparatus for a vehicle according to the embodiment.

FIG. 2 is an explanatory diagram illustrating the functional configuration of a part of the control apparatus 100 for a vehicle including the controllers illustrated in FIG. 1 which is related to driving mode switching control. The control apparatus 100 includes a target driving force calculator 121, a driving mode setter 123, a driving force difference calculator 125, a delay controller 127, and a drive controller 129.

(Target Driving Force Calculator)

For example, the main controller 101 functions as the target driving force calculator 121. The target driving force calculator 121 calculates the target driving force of the hybrid vehicle 1. For example, the target driving force calculator 121 refers to a driving force map stored in advance in a storage, and calculates target driving force on the basis of signals of the accelerator sensor 81 and the engine speed sensor 87.

In the case where the hybrid vehicle is being subjected to automated-driving control, the target driving force calculator 121 may calculate target driving force on the basis of an acceleration request value obtained according to calculation and a signal of the engine speed sensor 87 instead of a signal of the accelerator sensor 81.

Note that, in the case where the hybrid vehicle 1 is in the electrically-operated driving mode, the engine 11 is stopped. Accordingly, the target driving force depends on an accelerator position angle.

(Driving Mode Setter)

For example, the main controller 101 functions as the driving mode setter 123. The driving mode setter 123 switches the driving mode of the hybrid vehicle 1 to the electrically-operated driving mode and the hybrid driving mode on the basis of target driving force calculated by the target driving force calculator 121 and the vehicle speed of the hybrid vehicle 1 which is obtained on the basis of a signal of the vehicle speed sensor 85. The electrically-operated driving mode is a driving mode for transmitting only the power of the motor generator 31 to the driving wheels 47. The hybrid driving mode is a driving mode for transmitting the power of the motor generator 31 and the engine 11 to the driving wheels 47.

Figure 3:
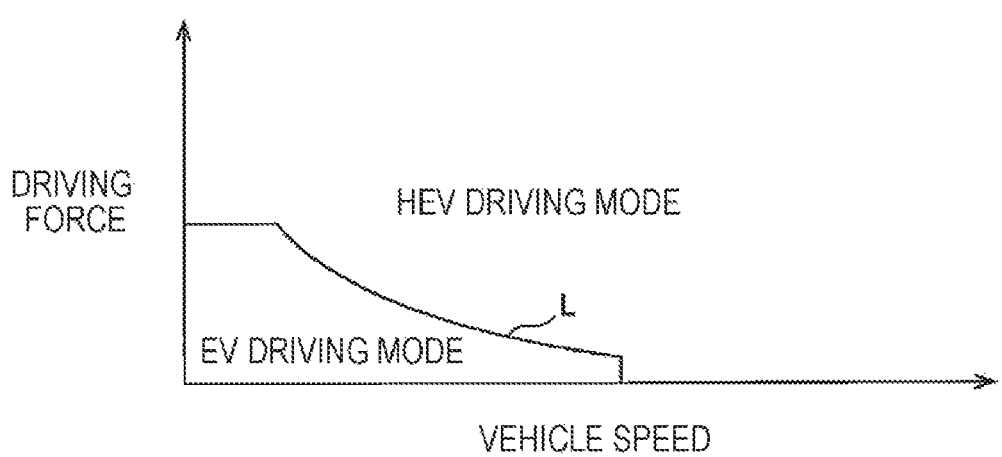
FIG. 3 is a flowchart illustrating region setting of a driving mode.

FIG. 3 is an explanatory diagram illustrating the outline of region setting of the driving mode. The hybrid vehicle 1 is set at the electrically-operated driving mode when the target driving force is lower than or equal to a continuous line (which will also be referred to as "mode switching line" below) L of a mode switching threshold which is set in accordance with the vehicle speed, and set at the hybrid driving mode when the target driving force exceeds the mode switching line L. The mode switching threshold is set to be smaller as vehicle speed increases.

Figure 4:
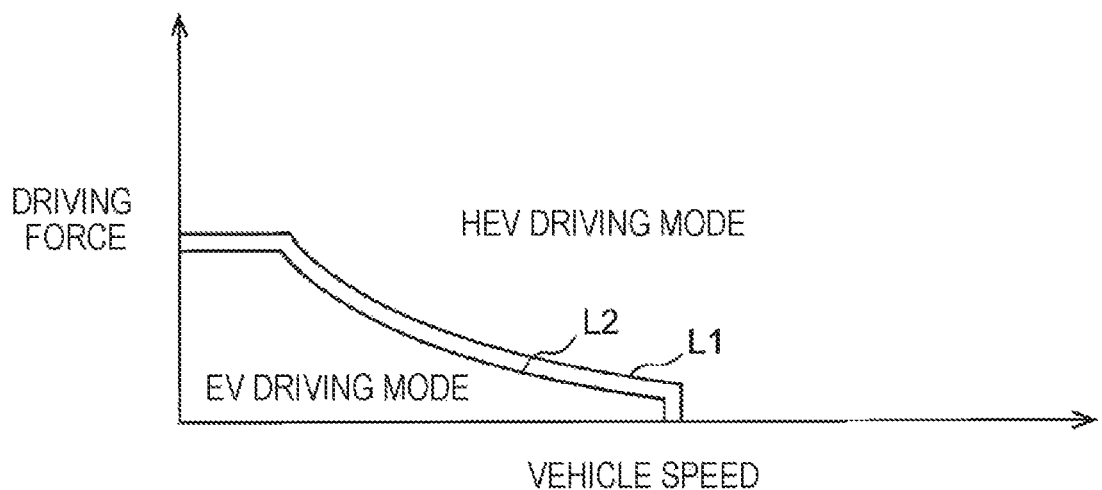
FIG. 4 is an explanatory diagram illustrating an EV end threshold and an EV restore threshold.

As illustrated in FIG. 4, the mode switching line L may include an EV end line L1 for switching the driving mode from the electrically-operated driving mode to the hybrid driving mode, and an EV restore line L2 for switching the driving mode from the hybrid driving mode to the electrically-operated driving mode. The use of the EV end line L1 and the EV restore line L2 makes it possible to suppress the engine 11 repeatedly starting and stopping in a short time with fluctuation in target driving force.

However, the driving mode setter 123 delays a switch of the driving mode during a delay time set by the delay controller 127 after the target driving force crosses the mode switching line L.

(Driving Force Difference Calculator)

For example, the main controller 101 functions as the driving force difference calculator 125. The driving force difference calculator 125 calculates a driving force difference that is a difference between target driving force and a mode switching threshold. Specifically, the absolute value of a difference between the target driving force calculated by the target driving force calculator 121 and the mode switching threshold corresponding to the vehicle speed of the hybrid vehicle 1 is used as a driving force difference.

For example, in the case where the EV end line L1 is crossed while the hybrid vehicle 1 is in the electrically-operated driving mode, the driving force difference calculator 125 sets a driving force excess amount that is a difference between the target driving force and the value corresponding to the vehicle speed on the EV end line L1 as a driving force difference. In addition, in the case where the EV restore line L2 is crossed while the hybrid vehicle 1 is in the hybrid driving mode, the driving force difference calculator 125 sets a driving force shortage amount that is a difference between the target driving force and the value corresponding to the vehicle speed on the EV restore line L2 as a driving force difference.

(Delay Controller)

For example, the main controller 101 functions as the delay controller 127. The delay controller 127 sets a delay time from target driving force crossing the mode switching line to the driving mode being switched on the basis of a driving force difference and vehicle speed. The delay time is set in accordance with the driving force difference and the vehicle speed. For example, the delay controller 127 may refer to a delay map stored in advance in a storage, and set a delay time on the basis of the driving force difference and the vehicle speed.

Figure 5:
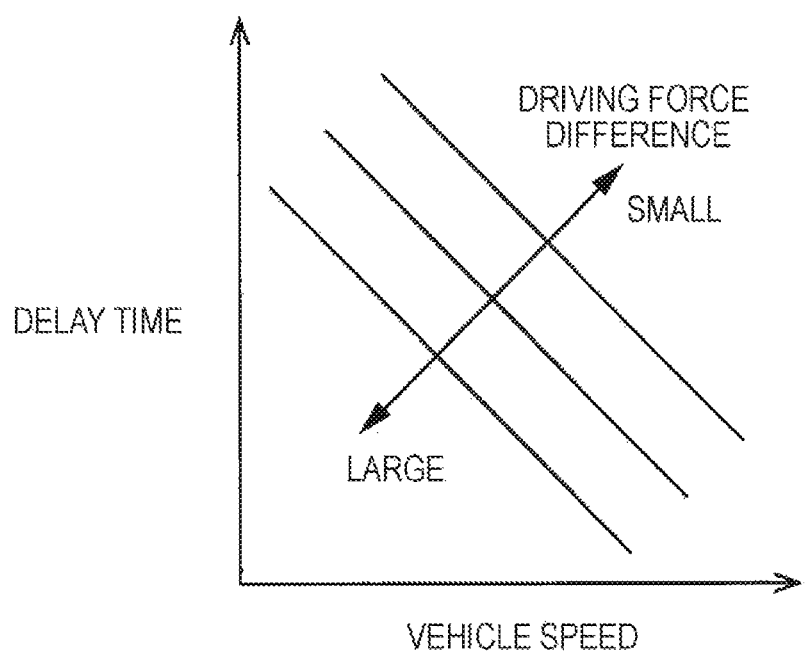
FIG. 5 is an explanatory diagram illustrating a setting example of a delay time in a case where target driving force exceeds the EV end threshold.

FIG. 5 illustrates the outline of a first delay map for switching the driving mode from the electrically-operated driving mode to the hybrid driving mode. The delay time in this case is set as a shorter time as vehicle speed increases in the case of the same driving force difference. In addition, the delay time is set as a shorter time as a driving force difference increases in the case of the same vehicle speed. For example, the delay time is set to be shorter as vehicle speed increases or a driving force difference increases, assuming two seconds in the case of a vehicle speed of 20 to 40 km/h and a driving force difference of 0 to 100 N.

That is, in the case of a larger accelerator position angle, a longer delay time is set to delay a start of the engine 11. Meanwhile, in the case of a smaller accelerator position angle, a shorter delay time is set to quickly start the engine 11. This both suppresses a temporary start of the engine 11 which includes the case where an accelerator is slowly stepped on more, and achieves acceleration responsiveness for a small accelerator position angle.

Figure 6:
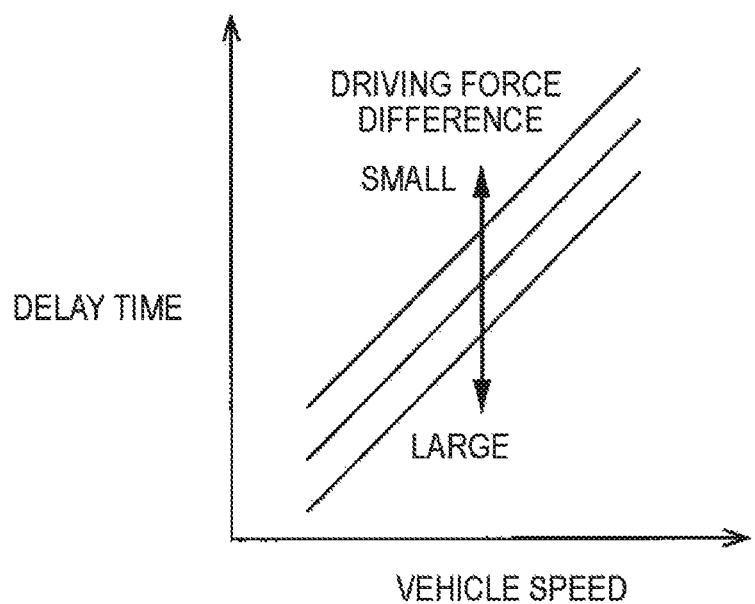
FIG. 6 is an explanatory diagram illustrating a setting example of a delay time in a case where the target driving force falls below the EV restore threshold.

FIG. 6 illustrates the outline of a second delay map for switching the driving mode from the hybrid driving mode to the electrically-operated driving mode. The delay time in this case is set as a longer time as vehicle speed increases in the case of the same driving force difference. In addition, the delay time is set as a shorter time as a driving force difference increases in the case of the same vehicle speed. That is, even in the case where an accelerator is released while traveling at high speed, a stop of the engine 11 is delayed. Meanwhile, in the case where an accelerator is released while traveling at low speed, the engine 11 is quickly stopped. This can keep the engine 11 running in the case where the engine 11 is stopped, but is likely to be restarted, and improve acceleration responsiveness.

(Drive Controller)

For example, the main controller 101, the engine controller 103, the transmission controller 105, and the motor controller 107 function as the drive controller 129. The drive controller 129 switches the engine clutch 23 to the engaged state or the release state in accordance with the set driving mode. That is, in the electrically-operated driving mode, the engine clutch 23 is set in the release state. In the hybrid driving mode, the engine clutch 23 is set in the engaged state. The drive controller 129 sets the gear ratio of the CVT 25 in accordance with vehicle speed and target driving force to control the CVT 25.

In addition, the drive controller 129 distributes the target driving force to the engine 11 and the motor generator 31 in accordance with the driving mode to perform drive control over the engine 11 and the motor generator 31. Specifically, in the electrically-operated driving mode, the drive controller 129 controls electric power to be supplied to the inverter 115 to control power output from the motor generator 31. In addition, in the hybrid driving mode, also controlling the power of motor generator 31, the drive controller 129 controls the opening degree of the throttle valve 13 and electric power to be supplied to the injector 15 to control power output from the engine 11.

<4. Operation Example of Control Apparatus>

Next, a driving mode switching process performed by the control apparatus 100 for the hybrid vehicle 1 according to the embodiment will be described.

(4-1. Transition from Electrically-Operated Driving Mode to Hybrid Driving Mode)

Figure 7:
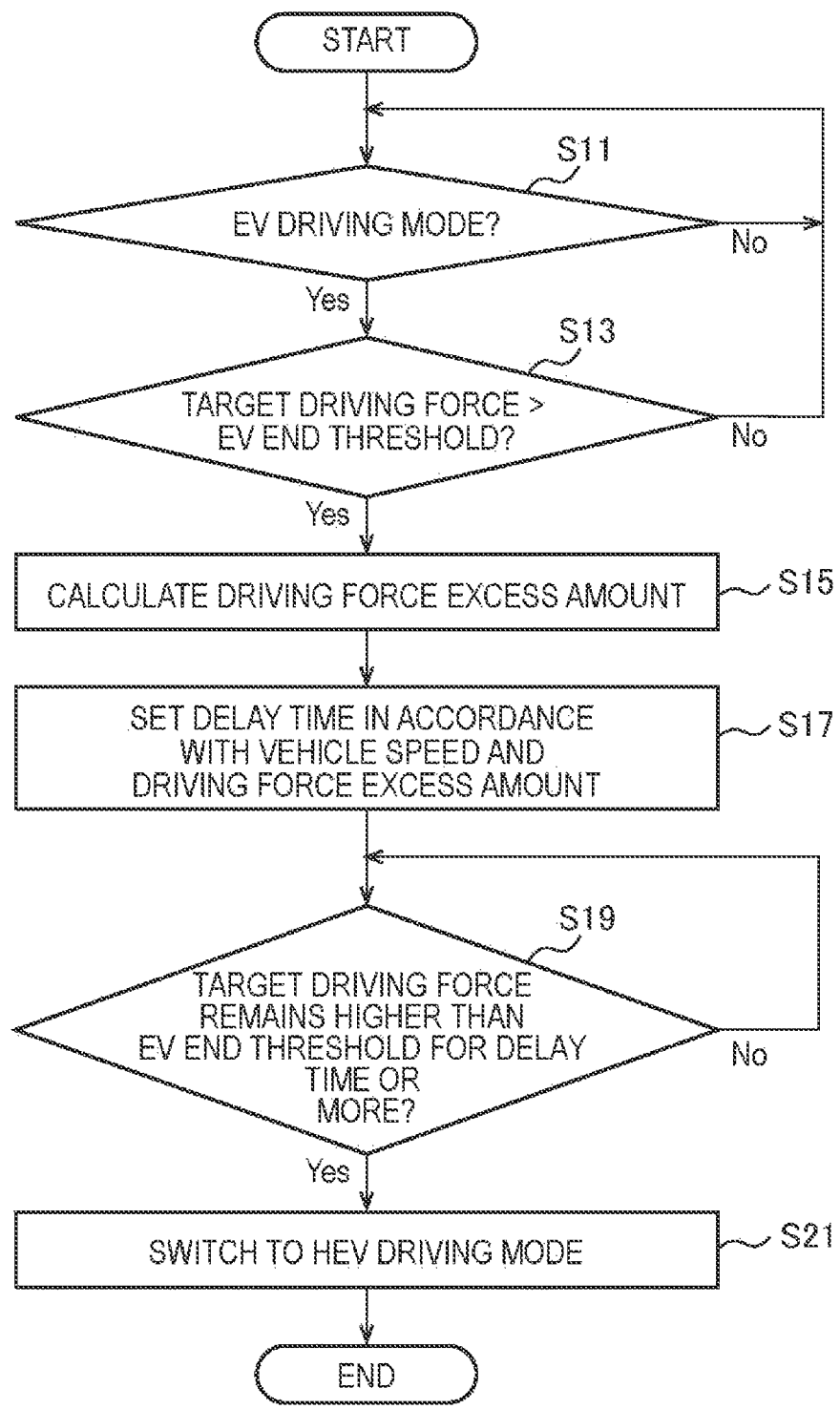
FIG. 7 is a flowchart illustrating a process of switching an electrically-operated driving mode to a hybrid driving mode.

FIG. 7 is a flowchart illustrating an example of an operation of switching the driving mode from the electrically-operated driving mode to the hybrid driving mode.

The driving mode setter 123 determines whether the current driving mode is the electrically-operated driving mode (step S11). In the case where the driving mode is the electrically-operated driving mode (SU/Yes), the driving mode setter 123 determines whether the target driving force calculated by the target driving force calculator 121 is higher than the value (EV end threshold) corresponding to the current vehicle speed on the EV end line L1 (step S13). In the case where a negative determination is obtained in any of step S11 and step S13, the driving mode setter 123 returns to step S11 to repeat determination.

In contrast, in the case where the target driving force is higher than the EV end threshold (S13/Yes), the driving force difference calculator 125 subtracts the EV end threshold corresponding to the current vehicle speed from the target driving force to calculate a driving force excess amount (step S15). Next, the delay controller 127 refers to the first delay map exemplified in FIG. 5, and calculates a delay time on the basis of the current vehicle speed and the driving force excess amount (step S17).

Next, the driving mode setter 123 determines whether the elapsed time since the target driving force exceeds the EV end threshold continues for the delay time set in step S17 or more (step S19). Until the delay time elapses (S19/No), the driving mode setter 123 keeps the driving mode as the electrically-operated driving mode.

In contrast, in the case where the delay time elapses (S19/Yes), the driving mode setter 123 causes the driving mode to transition from the electrically-operated driving mode to the hybrid driving mode (step S21). This causes the drive controller 129 to start the engine 11, and the power of the engine 11 and the motor generator 31 causes drive control to be performed over the vehicle.

In this way, the control apparatus 100 for a vehicle according to the embodiment sets a delay time corresponding to the vehicle speed and the driving force excess amount to delay a start of the engine 11 in the case where the target driving force exceeds the EV end threshold. At this time, lower vehicle speed or a smaller driving force excess amount causes a longer delay time to be set. This sets a long delay time in the case of a large accelerator position angle and a relatively small acceleration request, extending a stop time of the engine 11. In addition, in the case where the target driving force falls below the EV end threshold in a short time, the engine 11 remains in the stop state. Thus, the fuel consumption amount of the engine 11 can be reduced. In contrast, in the case of a small accelerator position angle and a relatively large acceleration request, a short delay time is set to quickly start the engine 11, which can improve acceleration responsiveness.

(4-2. Transition from Hybrid Driving Mode to Electrically-Operated Driving Mode)

Figure 8:
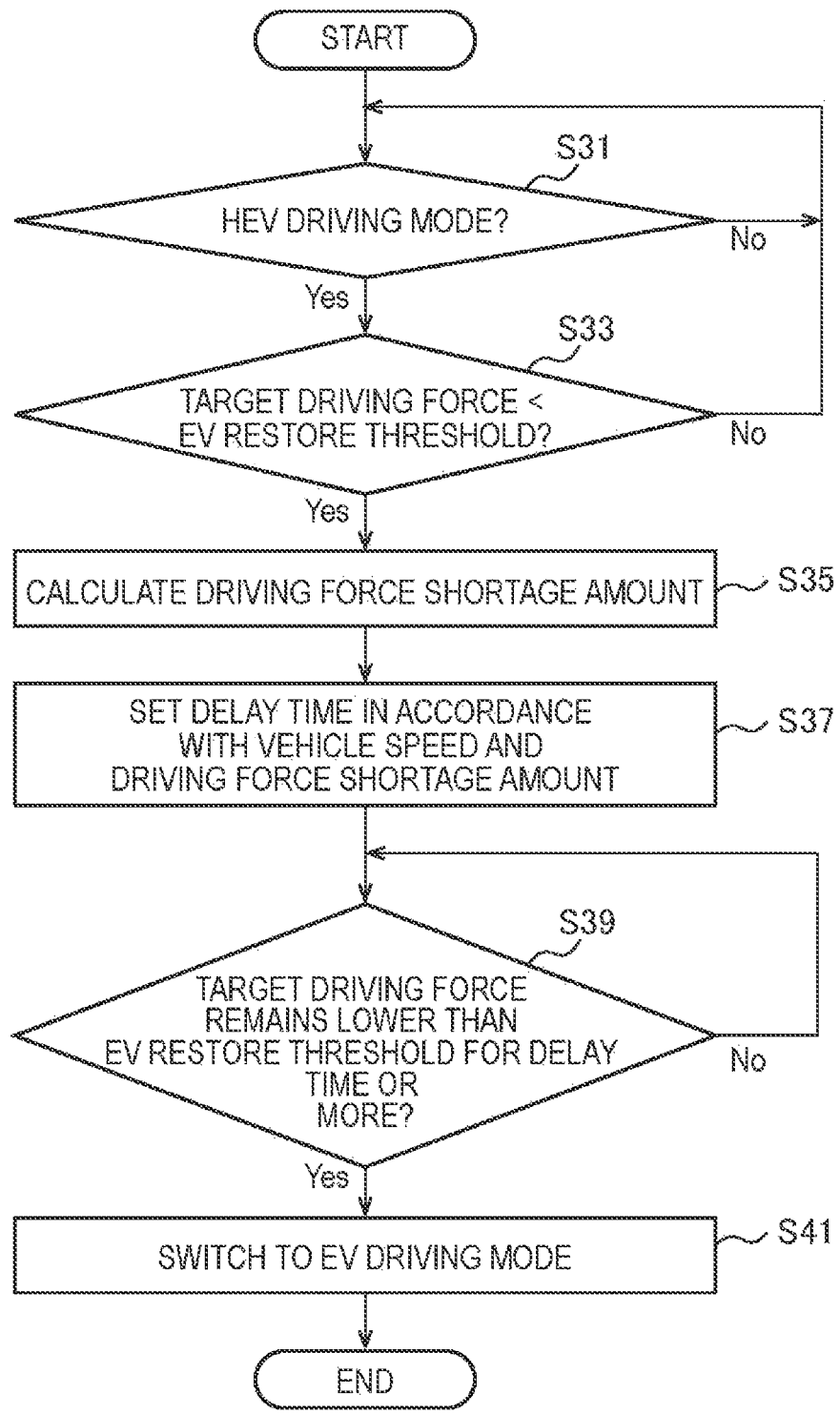
FIG. 8 is a flowchart illustrating a process of switching the hybrid driving mode to the electrically-operated driving mode.

FIG. 8 is a flowchart illustrating an example of an operation of switching the driving mode from the hybrid driving mode to the electrically-operated driving mode.

The driving mode setter 123 determines whether the current driving mode is the hybrid driving mode (step S31). In the case where the driving mode is the hybrid driving mode (S31/Yes), the driving mode setter 123 determines whether the target driving force calculated by the target driving force calculator 121 is lower than the value (EV restore threshold) corresponding to the current vehicle speed on the EV restore line L2 (step S33). In the case where a negative determination is obtained in any of step S31 and step S33, the driving mode setter 123 returns to step S31 to repeat determination.

In contrast, in the case where the target driving force is lower than the EV restore threshold (S33/Yes), the driving force difference calculator 125 subtracts the target driving force from the EV restore threshold corresponding to the current vehicle speed to calculate a driving force shortage amount (step S35). Next, the delay controller 127 refers to the second delay map exemplified in FIG. 6, and calculates a delay time on the basis of the current vehicle speed and the driving force shortage amount (step S37).

Next, the driving mode setter 123 determines whether the elapsed time since the target driving force falls below the EV restore threshold continues for the delay time set in step S37 or more (step S39). Until the delay time elapses (S39/No), the driving mode setter 123 keeps the driving mode as the hybrid driving mode.

In contrast, in the case where the delay time elapses (S39/Yes), the driving mode setter 123 causes the driving mode to transition from the hybrid driving mode to the electrically-operated driving mode (step S41). This causes the drive controller 129 to stop the engine 11, and only the power of the motor generator 31 causes drive control to be performed over the vehicle.

In this way, the control apparatus 100 for a vehicle according to the embodiment sets a delay time corresponding to the vehicle speed and the driving force shortage amount to delay a stop of the engine 11 in the case where the target driving force falls below the EV restore threshold. At this time, higher vehicle speed or a smaller driving force excess amount causes a longer delay time to be set. This sets a long delay time to delay a stop of the engine 11 in the case where an accelerator is released while traveling at high speed. Meanwhile, in the case where an accelerator is released while traveling at low speed, a short delay time is set to quickly stop the engine 11. Thus, in the case where the engine 11 is unlikely to be restarted, a long stop time can be set for the engine 11. Meanwhile, in the case where the engine 11 is stopped, but is likely to be restarted, the engine 11 is kept running and acceleration responsiveness can be improved.

<5. Effect of Control Apparatus>

Figure 9:
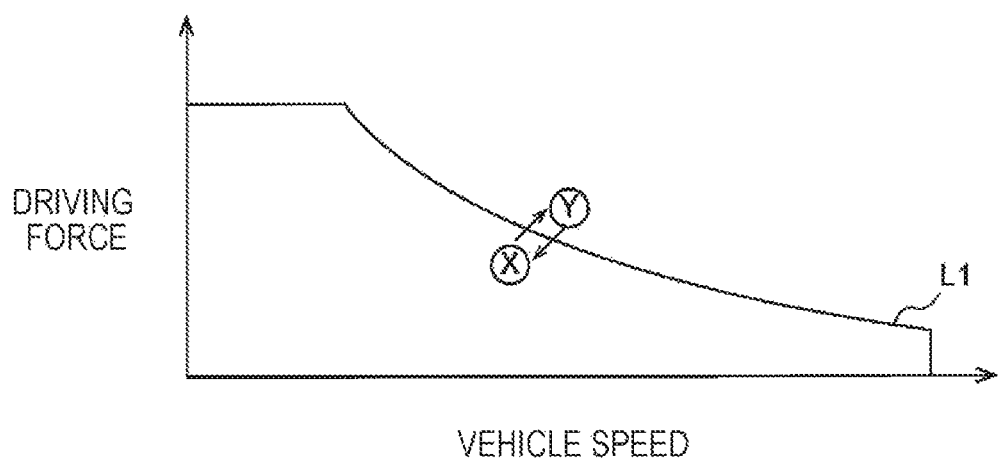
FIG. 9 is an explanatory diagram illustrating that the target driving force temporarily exceeds the EV end threshold.
Figure 10:
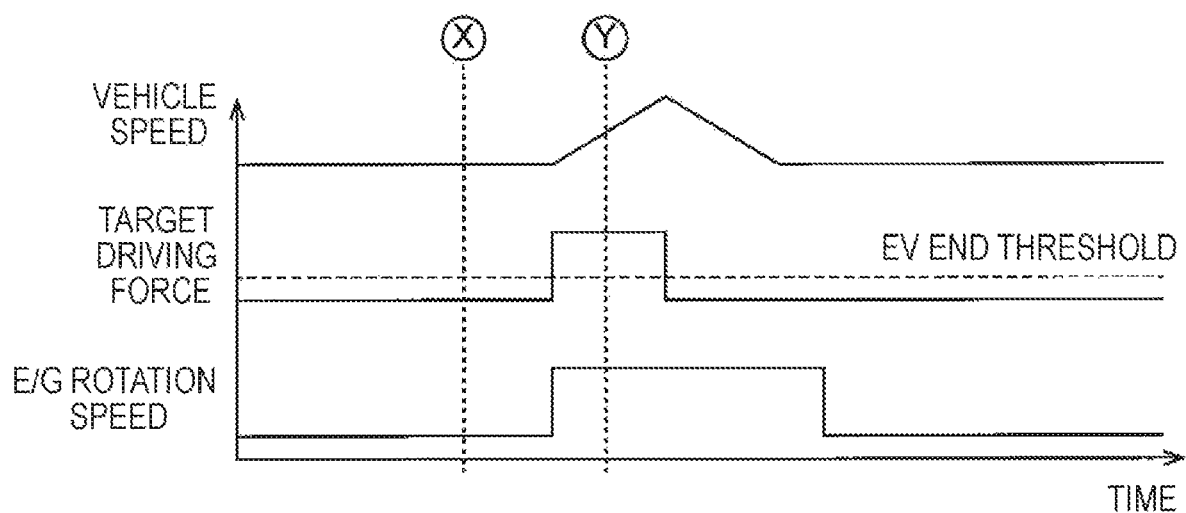
FIG. 10 is an explanatory diagram illustrating that an engine is started in a reference example in which no delay time is set.

Next, with reference to FIGS. 9 to 11, the effect of the control apparatus 100 for a vehicle according to the embodiment will be described. FIG. 9 is an explanatory diagram illustrating that the target driving force temporarily exceeds the EV end threshold. FIG. 10 illustrates a reference example in which no delay time is set, and FIG. 11 illustrates an example of the embodiment in which a delay time is set.

As illustrated in FIG. 9, it is assumed that an accelerator operation of a driver slightly increases the target driving force from a first value X to a second value Y temporarily across the EV end threshold, and then the target driving force is returned to the first value X immediately. In the case where no delay time is set as illustrated in FIG. 10, the engine 11 starts at a time point at which the target driving force exceeds the EV end threshold, and the engine 11 stops after the target driving force is returned to the first value X. In this way, in the reference example in which no delay time is set, the engine 11 remains in the running state for a predetermined time and fuel is consumed even in the case where the target driving force temporarily exceeds the EV end threshold.

Figure 11:
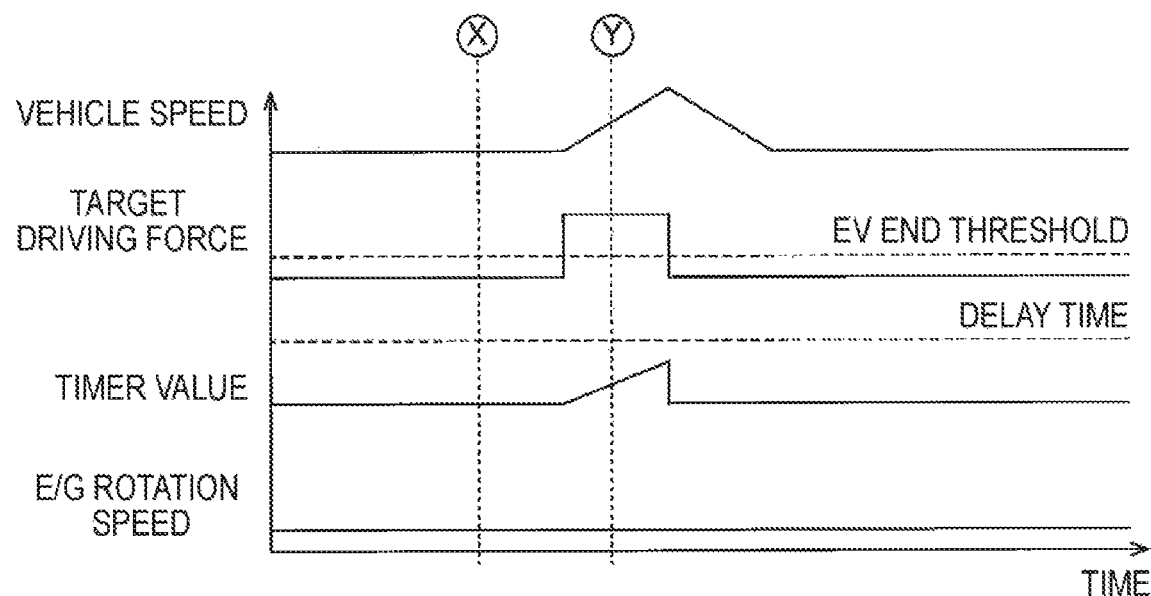
FIG. 11 is an explanatory diagram illustrating that the engine is not started in an example of the embodiment in which the delay time is set.

Meanwhile, in the case where a delay time is set as illustrated in FIG. 11, the engine 11 does not start at a time point at which the target driving force exceeds the EV end threshold. In the example of the embodiment, a delay time is set and a timer begins to count at a time point at which the target driving force exceeds the EV end threshold. Then, the target driving force falls below the EV end threshold again before the timer value reaches the delay time. The engine 11 does not thus start, but the electrically-operated traveling mode continues. In this way, the fuel consumption amount of the engine 11 is reduced.

<6. Applied Example>

The control apparatus 100 for a vehicle according to the embodiment has been described so far. The following describes an applied example of the control apparatus 100 for a vehicle according to the embodiment.

Figure 12:
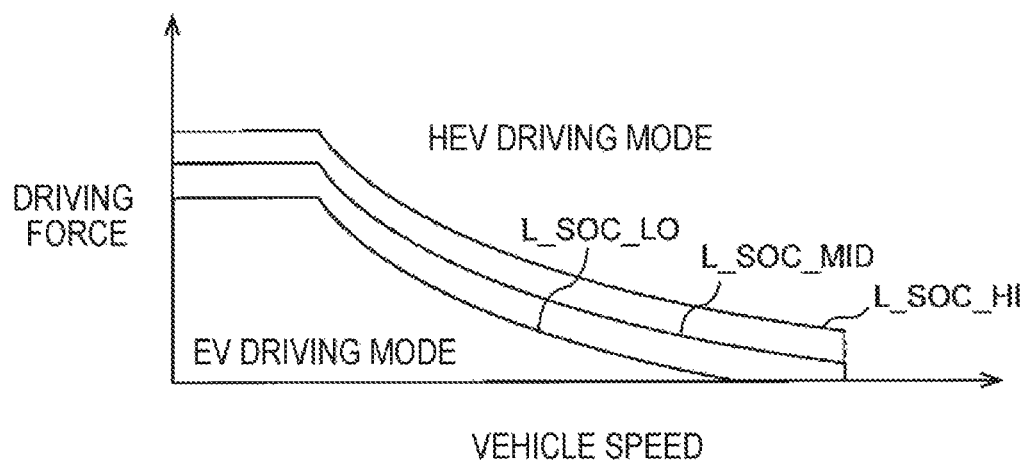
FIG. 12 is an explanatory diagram illustrating an applied example in which a mode switching line is changed in accordance with charge capacity of a battery.

FIG. 12 is an explanatory diagram illustrating an applied example of the control apparatus 100 for a vehicle. In the applied example, the mode switching line L changes in accordance with charge capacity SOC of the battery 117 that supplies electric power to the motor generator 31. Specifically, the mode switching line L is set to be smaller as the charge capacity SOC of the battery 117 decreases. FIG. 12 illustrates a mode switching line L_SOC_HI in the case where the charge capacity SOC is high, a mode switching line L_SOC_MID in the case where the charge capacity SOC is middle, and a mode switching line L_SOC_LO in the case where the charge capacity SOC is low.

In the applied example, once the charge capacity SOC of the battery 117 decreases, the EV end threshold also decreases. On the basis of the mode switching line corresponding to the charge capacity SOC at that time, a delay time is set. This can suppress the electrically-operated driving mode extending too much with a start of the engine 11 delayed in the state in which the charge capacity SOC is decreased. Thus, the electric power consumption amount of the battery 117 can be suppressed.

As described above, the control apparatus 100 for a vehicle according to the embodiment sets a delay time corresponding to the vehicle speed and the driving force excess amount to delay a start of the engine 11 in the case where the target driving force exceeds the EV end threshold. This makes the stop time of the engine 11 longer, and can reduce the fuel consumption amount.

In addition, the control apparatus 100 for a vehicle according to the embodiment sets a longer delay time as vehicle speed is lower or a driving force excess amount is smaller. This sets a long delay time in the case of a large accelerator position angle and a relatively small acceleration request, extending a stop time of the engine 11. In addition, in the case where the target driving force falls below the EV end threshold in a short time, the engine 11 remains in the stop state. Thus, the fuel consumption amount of the engine 11 can be reduced. In contrast, in the case of a small accelerator position angle and a relatively large acceleration request, a short delay time is set to quickly start the engine 11, which can improve acceleration responsiveness.

In addition, the control apparatus 100 for a vehicle according to the embodiment sets a delay time corresponding to the vehicle speed and the driving force shortage amount to delay a stop of the engine 11 in the case where the target driving force falls below the EV restore threshold. At this time, higher vehicle speed or a smaller driving force excess amount causes a longer delay time to be set. This sets a long delay time to delay a stop of the engine 11 in the case where an accelerator is released while traveling at high speed. Meanwhile, in the case where an accelerator is released while traveling at low speed, a short delay time is set to quickly stop the engine 11. Thus, in the case where the engine 11 is unlikely to be restarted, a long stop time can be set for the engine 11. Meanwhile, in the case where the engine 11 is stopped, but is likely to be restarted, the engine 11 is kept running and acceleration responsiveness can be improved.

In addition, in the control apparatus 100 for a vehicle according to the embodiment, the mode switching threshold may be set to be smaller as the charge capacity SOC of the battery 117 decreases. This can suppress the electrically-operated driving mode extending too much with a start of the engine 11 delayed in the state in which the charge capacity SOC is decreased. Thus, the electric power consumption amount of the battery 117 can be suppressed.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

For example, in the embodiment described above, the control apparatus 100 for a vehicle includes six controllers, but the disclosure is not limited to the example. The functions of some or all of the controllers described above may be integrated into one controller, or further divided into controllers.

According to the disclosure as described above, a delay time before switching a driving mode is set in accordance with the traveling state of a vehicle irrespective of the change speed of an accelerator position angle, and the fuel consumption amount can be reduced.

The invention claimed is:

1. A vehicle comprising:
    a drive motor;
    an engine; and
    a processor configured to switch an electrically-operated driving mode in which the drive motor is used and a hybrid driving mode in which the drive motor and the engine are used, the processor configured to:
        set the electrically-operated driving mode when a target driving force is lower than or equal to a continuous line of a mode switching threshold set in accordance with a vehicle speed, and set the hybrid driving mode when the target driving force exceeds the continuous line of the mode switching threshold;
        calculate a driving force difference that is a difference between the target driving force and the mode switching threshold; and
        set a delay time from the target driving force crossing the continuous line of the mode switching threshold to a driving mode being switched on a basis of the driving force difference and the vehicle speed.

2. The vehicle according to claim 1, wherein
    the mode switching threshold is set to be a smaller value as a charge capacity of a battery configured to supply an electric power to the drive motor is lower.

3. The vehicle according to claim 2, wherein
    the processor makes the delay time longer as the driving force difference is smaller.

4. The vehicle according to claim 2, wherein
    the mode switching threshold is an electric vehicle end threshold for causing a transition from the electrically-operated driving mode to the hybrid driving mode.

5. The vehicle according to claim 4, wherein
    the processor makes the delay time longer as the vehicle speed is lower.

6. The vehicle according to claim 2, wherein
    the mode switching threshold is an electric vehicle restore threshold for causing a transition from the hybrid driving mode to the electrically-operated driving mode.

7. The vehicle according to claim 6, wherein
    the processor makes the delay time longer as the vehicle speed is lower.

8. The vehicle according to claim 1, wherein
    the processor makes the delay time longer as the driving force difference is smaller.

9. The vehicle according to claim 1, wherein
    the mode switching threshold is an electric vehicle end threshold for causing a transition from the electrically-operated driving mode to the hybrid driving mode.

10. The vehicle according to claim 9, wherein
    the processor makes the delay time longer as the vehicle speed is lower.

11. The vehicle according to claim 1, wherein
    the mode switching threshold is an electric vehicle restore threshold for causing a transition from the hybrid driving mode to the electrically-operated driving mode.

12. The vehicle according to claim 11, wherein
    the processor makes the delay time longer as the vehicle speed is lower.

13. A control method for a vehicle, comprising:
    detecting a vehicle speed by a vehicle speed sensor;
    controlling a driving force of the vehicle while switching an electrically-operated driving mode in which a drive motor is used, and a hybrid driving mode in which the drive motor and an engine are used, the electrically-operated driving mode being set when a target driving force is lower than or equal to a continuous line of a mode switching threshold set in accordance with the vehicle speed, the hybrid driving mode being set when the target driving force exceeds the continuous line of the mode switching threshold, the control method comprising:
    setting, when the target driving force crosses the continuous line of the mode switching threshold, a delay time from the target driving force crossing the continuous line of the mode switching threshold to a driving mode being switched on a basis of a driving force difference that is a difference between the target driving force and the mode switching threshold, and the vehicle speed.

14. A vehicle comprising:
    a drive motor;
    an engine;
    circuitry configured to switch an electrically-operated driving mode in which the drive motor is used and a hybrid driving mode in which the drive motor and the engine are used,
    wherein the circuitry is configured to:
        set the electrically-operated driving mode when a target driving force is lower than or equal to a continuous line of a mode switching threshold set in accordance with a vehicle speed, and set the hybrid driving mode when the target driving force exceeds the continuous line of the mode switching threshold,
        calculate a driving force difference that is a difference between the target driving force and the mode switching threshold, and
        set a delay time from the target driving force crossing the continuous line of the mode switching threshold to a driving mode being switched on a basis of the driving force difference and the vehicle speed.

\* \* \* \* \*